United States Patent
Dusi et al.

(10) Patent No.: US 12,552,070 B2
(45) Date of Patent: Feb. 17, 2026

(54) METHOD AND PLANT FOR COOLING A MIXTURE OF INGREDIENTS OF CONCRETE

(71) Applicant: ICM S.r.l., Albaredo d'Adige (IT)

(72) Inventors: Claudio Dusi, Soave (IT); Icilio Guicciardi, Ravenna (IT)

(73) Assignee: ICM S.R.L., Albaredo d'Adige (IT)

( * ) Notice: Subject to any disclaimer, the term of this patent is extended or adjusted under 35 U.S.C. 154(b) by 811 days.

(21) Appl. No.: 17/796,617

(22) PCT Filed: Feb. 4, 2021

(86) PCT No.: PCT/EP2021/052692
§ 371 (c)(1),
(2) Date: Jul. 29, 2022

(87) PCT Pub. No.: WO2021/156379
PCT Pub. Date: Aug. 12, 2021

(65) Prior Publication Data
US 2023/0059043 A1    Feb. 23, 2023

(30) Foreign Application Priority Data
Feb. 4, 2020    (EP) .................................. 20155314

(51) Int. Cl.
 B28C 5/46    (2006.01)
 B28C 7/00    (2006.01)
 F25D 31/00    (2006.01)
(52) U.S. Cl.
 CPC ............. *B28C 5/468* (2013.01); *B28C 5/464* (2013.01); *B28C 7/0038* (2013.01); *F25D 31/00* (2013.01)

(58) Field of Classification Search
 CPC ............................ B28C 5/468; B28C 7/0038
 See application file for complete search history.

(56) References Cited

U.S. PATENT DOCUMENTS 4,361,405 A * 11/1982 Wedek ...................... B22C 5/04
                                                366/139
5,915,833 A *  6/1999 Kruse ...................... B22C 5/08
                                                366/139

FOREIGN PATENT DOCUMENTS

CN        207169723 U    4/2018
DE    202004006122 U1    8/2004
(Continued)

*Primary Examiner* — Elizabeth Insler
(74) *Attorney, Agent, or Firm* — Carmel Patent Agency; Robert Ballarini (57) ABSTRACT

A method and plant for cooling a mixture of concrete, includes: loading in a hermetically sealed tank a given quantity of ingredients to form the concrete, the ingredients including a predetermined quantity of water; regulating the pressure in the tank to obtain a transitory degree of vacuum in the tank; regulating the pressure inside a hermetically sealed condensation chamber to obtain a basic degree of vacuum in the condensation chamber that is greater than the transitory degree of vacuum, such that the pressure in the condensation chamber is lower than the pressure in the tank; operatively connecting the tank and the condensation chamber to substantially equalize the internal pressure in the tank and in the condensation chamber to a resulting degree of vacuum and to cause at least partial evaporation of the water from the tank towards the condensation chamber to lower the temperature of the ingredients in the tank.

14 Claims, 4 Drawing Sheets

(56) References Cited

FOREIGN PATENT DOCUMENTS

| | | | |
|---|---|---|---|
| JP | H01198307 | A | 8/1989 |
| JP | H03268905 | A | 11/1991 |
| JP | H0852729 | A | 2/1996 |

* cited by examiner

METHOD AND PLANT FOR COOLING A MIXTURE OF INGREDIENTS OF CONCRETE

FIELD OF THE INVENTION

The subject matter of the present invention is a method and a plant for cooling a mixture of ingredients of concrete, The present invention relates in particular to a method and a plant for cooling a mixture of ingredients of concrete using the latent heat from evaporation of water.

BACKGROUND

Concrete is a construction mix obtained by mixing construction aggregate materials (sand, gravel, crushed stone) in appropriate doses with a binding agent, such as cement, which is then activated in the presence of water. In particular, the ratio of water to cement which characterizes a concrete mixture is an essential parameter of the mixture design, which must not be altered since it must be suitable for guaranteeing that the concrete has the required performance levels on the basis of the needs of the architect and the characteristics of the raw materials to be used. In addition, the ratio of water to cement is important for guaranteeing both the correct fluidity of the mix and above all the final strength of the concrete. Therefore, this ratio cannot be altered at will.

In order to form the concrete, the various ingredients of the concrete are poured into a single container n a required dose in order to form a mixture of ingredients of the concrete. This mixture comprises construction aggregates, cement and water in a predetermined quantity. The ingredients of said mixture are then mixed, or kneaded, so as to amalgamate them and form a concrete mix.

The concrete is cast in the fluid state and gradually passes to the solid state, which reaction is known as setting of the concrete. Alternatively, the concrete can be cast in the form of RCC (an acronym for "roller-compacted concrete"), which is used in the building of dams.

During the setting, various chemical-physical reactions occur, which take place during the hydration of the cement.

During the setting, the concrete must remain as far as possible in a humid environment, in order to guarantee that the complete process of hydration of the cement takes place, and thus that the concrete has good mechanical and strength properties.

In addition, during the setting, the concrete must remain below the maximum temperatures permitted, in order to avoid thermal stresses. This problem applies in particular when the cool concrete is cast in environments with high temperatures and/or low humidity, and/or when the casting is intended for massive works, such as dams and foundations for example.

In such cases, the formation of cracks may occur.

The formation of cracks can be prevented by limiting the temperature of the cool concrete at the time of casting. In fact, strict standards exist relating to the temperature of the cool concrete. For example, in some cases, the temperature of the cool concrete must not exceed 25° C. In addition, the applicant has determined that, in order to cast the concrete in environments with high temperatures, it may be necessary to cool the concrete to temperatures which may be as low as 10° C. or less.

In order to comply with these requirements, various measures have been adopted.

Methods have been proposed and used to separately cool the various ingredients of the concrete, such as the construction aggregate materials, before combining them in a mixture of ingredients of the concrete.

It is known for example to cool the construction aggregate materials before mixing in order to form the concrete with water or with air.

A known system uses ice and cold water for this purpose. In this system, the need to maintain a stock of cold water and a stock of ice ready to use means that a specific, significant quantity of energy is expended in order to compensate for the dispersion of heat, and not to cool the concrete itself directly. In addition, the degree of cold which can be achieved by means of this system is greatly limited, since the ice and the cold water are the only ingredients of the mixture which have a cooling capacity, said ingredients representing approximately only 5% of the entire mixture. Consequently, in a typical case in which the mean temperature of the non-cooled concrete is approximately 30° C., a system which uses only ice and cold water does not allow to cool the construction aggregates or the concrete to temperatures lower than 25° C.

For cooling, another known system uses cold water, ice and cold air which is blown inside cooling silos. This technique makes it possible to pre-cool the large aggregates, but not the fine ones. In fact, this technique requires the size of the aggregate itself to be large "enough" to constitute a "porous" mass which allows the air to move between the stones themselves, impelled by high-power fans. Thus, both the sand and the cement, which constitute approximately 40% of the total of the concrete mix, cannot be pre-cooled in this way. Therefore, in a typical case in which the mean temperature of the non-cooled concrete is approximately 30° C., a system which uses cold water, ice and cold air does not make it possible to cool the construction aggregates or the concrete to temperatures lower than 22° C. Furthermore, in addition to the problems described in the case of using only water and ice, there is the problem caused by the fact that the electrical power required to supply the fans is high, and in practical cases can be of the order of 1 kW per $m^3$/h of the nominal capacity of the production plant.

In addition, cooling with water or with air is not suitable for use in the case of small-sized construction aggregates. In fact, the finest particles are washed away or blown away, thus varying the properties of the cooled material at the output from the cooling process. Moreover, a deposit of fine construction aggregate has porosity which is so low that the flow of cold air between the particles is inhibited in practice.

In a more sophisticated known system, in addition to the use of cold water and ice, the larger aggregates (crushed stone) are cooled on a slowly advancing conveyor belt onto which jets of cold water are sprayed onto the crushed stone itself. The sand, on the other hand, is passed through a rotary cylinder into which a flow of cold air is blown in the direction opposite to the flow of sand. Although this system is sophisticated, it does not allow to cool the concrete to temperatures lower than 12° C. In addition, it is apparent that this solution involves the presence of additional components, thus contributing towards increasing the costs and the complexity of the plant. Furthermore, a plant of this type is not compatible with the production of RCC, since, unlike conventional concrete, RCC must contain fine particles. Therefore, unlike the construction aggregates for conventional concrete, the construction aggregates for RCC must not be washed, in order to not lose said fine particles. Since the wet conveyor belt acts as a washing system, this gives rise to the removal of the fine particles, which are however indispensable for the production of RCC, consequently making the use of this technology incompatible with the production of RCC.

In addition, the aforementioned methods involve considerable energy consumption because of the need to keep these construction aggregate materials at a low temperature after cooling, until the concrete is mixed. It is therefore necessary to provide additional cooling power which is needed to keep the temperature of the construction aggregates at the required levels throughout the entire time which elapses between the cooling process and use. It is also costly to store cooled construction aggregates during a breakdown of one of the plants downstream of the production and distribution line for the concrete. In fact, in the event of stoppage or breakdown of the plants upstream or downstream, maintenance of the temperature cannot be interrupted, since the cooling of an entire silo of hot aggregate can require more than a day.

It is clear that the energy expenditure associated with such methods is very high.

In addition to the disadvantages described above in relation to the prior art, the applicant has found that said cooling systems require cooling times of several hours, which times are therefore very long.

Other known systems involve the use of a vacuum to cool the construction aggregates. In these systems, the aggregate materials are wetted and supplied to a sealed tank in which the pressure is lowered, causing the evaporation of some water, and consequent cooling of the aggregates.

The aggregates thus cooled then receive the cement in order to form a concrete mixture.

In order to obtain cold concrete, it is therefore necessary to cool down the construction aggregates so as to compensate for the supply of heat caused by the addition of cement which has not previously been cooled. However, as well as being costly, this cooling down is also inefficient, since it does not make it possible to obtain a concrete mixture which is sufficiently cold and at the desired temperature.

Furthermore, the prior art which relates to the vacuum cooling of construction aggregates of various sizes is particularly unsatisfactory. In fact, stones with a large diameter have a ratio of volume to surface area which is greater than that of smaller stones. Consequently, the water which wets the larger stones is evaporated without the inner volume thereof having been cooled to the desired temperature, unlike smaller stones which tend to cool rapidly because of their high ratio of surface area to volume.

In addition, the known systems for vacuum cooling the construction aggregates have been tested by the applicant, and various technical and thermodynamic limits have been found which make it extremely difficult to achieve temperatures of the concrete which are lower than 15° C. Furthermore, the lack of cooling of the cement makes it necessary to cool the aggregates down to levels which are not compatible with the vacuum technique used.

In fact, it has been found that it is necessary to supply these cooling plants with pre-cooled aggregates. This pre-cooling of the aggregates involves the use of cooled and insulated hoppers which give rise to a further substantial cost in terms of electrical energy and investment. Practical experience indicates that the thermal dispersions in the case of pre-cooling the construction aggregates are approximately 1 kW for each $m^3/h$ of the nominal capacity of the production plant.

In addition, these systems do not guarantee the conservation of the ratio of water to cement during the cooling process. Thus, the uncertainty concerning the residual quantity of water contained in the resulting mix makes the ratio of water to cement in the final mix uncertain.

This problem is exacerbated by the fact of working with increased quantities of water.

In all cases, therefore, it is not possible to comply with the proportion of water or the ratio of water to cement indicated by the concrete recipe. Furthermore, the systems for vacuum cooling by evaporation according to the prior art do not make it possible to comply with the mixing times and precision in dosing the products that are indicated by the standards, and in particular to prevent the risk of the so-called segregation of the concrete after the formation thereof.

In addition, the systems for vacuum cooling by evaporation according to the prior art are unsatisfactory in terms of both energy and time necessary for the cooling process.

In addition, the cooling of the construction aggregates which can be obtained by means of the known systems is often not sufficient to achieve the desired temperature of the casting.

SUMMARY

The technical problem addressed by the present invention is to provide a method and a plant for cooling a mixture of ingredients of concrete which are structurally and functionally designed to at least partly eliminate one or more of the disadvantages described with reference to the prior art. This problem is solved by the invention by means of a method and a plant for cooling a dose of ingredients of concrete which are produced in accordance with the appended claims.

According to an aspect of the present invention, a method is provided for cooling a mixture of ingredients of concrete, which method comprises loading in a first hermetically sealed tank a first given quantity of ingredients at a first initial temperature, wherein the ingredients are intended to form the concrete and comprise a predetermined first quantity of water.

Preferably, the first quantity of water is imposed by a ratio of water to cement established by a design of the concrete mixture.

The pressure in the first tank is also regulated so as to obtain a first transitory degree of vacuum.

In addition, the method preferably comprises regulating the pressure inside a hermetically sealed condensation chamber so as to obtain a basic degree of vacuum greater than the first transitory degree of vacuum, i.e. such that the pressure in the condensation chamber is lower than the pressure in the first tank.

Subsequently, the first tank and the condensation chamber are operatively connected so as to substantially equalize the internal pressure in the first tank and in the condensation chamber to a resulting degree of vacuum so as to cause at least partial evaporation of the water from the first tank towards the condensation chamber, so as to lower the temperature of the ingredients in the first tank. Advantageously, the evaporation of the water comprises extraction of a quantity of energy corresponding to the latent heat of evaporation of the water from the environment in which the evaporation takes place, and therefore comprises cooling the ingredients in the first hermetically sealed tank.

Preferably, the method also comprises condensing in the condensation chamber the water evaporated from the first tank and conveying the condensed water from the condensation chamber to the first tank.

According to a further advantageous aspect, and preferably without delays, the condensed vapor is readmitted into the condensation chamber in the form of cold liquid water, directly into the mix from which it had been evaporated, thus guaranteeing the compliance of the ratio of water to concrete throughout the entire process.

The method comprises collecting the ingredients from the first tank at a first output temperature which is lower than the first initial temperature. The first output temperature depends on factors such as the thermal inertia and the quantity of material introduced into the first tank, the initial temperature of the material, and the quantity of water evaporated/condensed during the process.

By acting on said variables, it is therefore possible to obtain by means of the method according to the invention a mixture of concrete ingredients which have a desired temperature.

The method according to the invention thus makes it possible to make use of the latent heat of evaporation of the water in order to cool a mixture of ingredients of the concrete comprising water in a predetermined given quantity.

The recycling of the condensed water from the condensation chamber to the first tank makes it possible to keep the predetermined first quantity of water present in the mixture of concrete ingredients in the first tank substantially unvaried.

This therefore also makes it possible to cool the mixture of ingredients of the concrete without substantially modifying the quantity of water provided in said mixture.

By means of the method according to the invention, a cold mixture of concrete ingredients is thus obtained. In addition, by mixing said mixture of concrete ingredients, a mix of concrete ingredients is obtained which is suitable for being cast immediately, without needing further modifications or adjustments of the composition of the mixture of ingredients itself.

In addition, the quantity of water necessary to form the desired mixture of concrete ingredients is cooled.

Advantageously, the ingredients comprise aggregate materials, cement and water in a relative proportion which is predetermined in order to obtain a desired recipe of the concrete.

The ingredients are loaded in a quantity such that the water and the cement are in a pre-determined proportion according to the desired recipe of the concrete.

Preferably, the inert materials are selected from a group comprising sand, gravel or crushed stone. Advantageously, the aggregate materials also comprise fillers or additives.

Conveying the condensed water from the condensation chamber to the first tank substantially restores the predetermined quantity of water in the mixture of concrete ingredients. By this means, the present invention makes it possible to cool the concrete without substantially altering the quantity of water present in the mixture of ingredients, and thus without substantially altering the final properties of the concrete.

The ingredients of the mixture of concrete ingredients can be mixed together so as to form a mix of concrete ingredients inside the first tank, before being discharged outside the tank.

Alternatively, the preparation of the mix which has been mixed but not yet cooled can be carried out outside the first tank in a dedicated mixing tank.

In some versions, the mixture of ingredients of the concrete is mixed and kneaded by means of a mechanical mixer.

According to a second aspect of the invention, a method is provided for cooling a mixture of ingredients of the concrete by means of a plurality of hermetically sealed tanks which can be interconnected to one another, each tank being connected to a common condensation chamber.

Advantageously, said mutual interconnection of the tanks makes it possible to reduce the energy consumption and the cycle times of a single tank, and also makes it possible to increase the specific capacity per tank.

In a starting phase, the method comprises regulating the pressure inside the plurality of hermetically sealed tanks and inside the condensation chamber so as to obtain an initial degree of vacuum, i.e., an internal pressure degree which is lower than atmospheric pressure.

According to the method, the plurality of hermetically sealed tanks and the hermetically sealed condensation chamber are operatively connected to one another, and the pressure is regulated inside the hermetically sealed tanks and inside the condensation chamber which are operatively connected to one another so as to obtain the initial degree of vacuum.

In regular operation, the method comprises loading into a first tank of the plurality of hermetically sealed tanks a first quantity of ingredients at a first initial temperature, the ingredients being intended to form the concrete and comprising a first predetermined quantity of water.

At this point, the first tank and a second tank of the plurality of hermetically sealed tanks are operatively connected so as to substantially equalize the internal pressure in the first tank and in the second tank to a residual degree of vacuum, the first tank having an initial internal pressure degree equal to the atmospheric pressure, the second tank having an initial internal pressure degree lower than the atmospheric pressure.

A second quantity of ingredients at a second initial temperature is then loaded into the second tank, these ingredients being intended to form the concrete, these ingredients comprising a second predetermined quantity of water.

Preferably, the second initial temperature and the second predetermined quantity of water are substantially equal to the first initial temperature and to the first predetermined quantity of water, respectively.

Subsequently, the pressure inside the first tank is regulated so as to obtain a first transitory degree of vacuum in the first tank. Also, the pressure inside the hermetically sealed condensation chamber is regulated so as to obtain a basic degree of vacuum greater than the first transitory degree of vacuum, i.e., such that the pressure in the condensation chamber is lower than the pressure in the first tank. Preferably, the pressure in the condensation tank should be as low as possible.

Subsequently, the method comprises operatively connecting the first tank and the condensation chamber so as to substantially equalize the internal pressure in the first tank and in the condensation chamber to a resulting degree of vacuum so as to cause at least partial evaporation of the water contained in the first tank towards the condensation chamber, so as to lower the temperature of the ingredients in the first tank.

The water evaporated in the first tank is condensed in the condensation chamber and is preferably readmitted into the first tank as illustrated better hereinafter. At this point, the process of cooling in the first tank is ended.

The first tank and the second tank are then operatively connected so as to substantially equalize the internal pressure in the first tank and in the second tank to a further residual degree of vacuum, the second tank having an initial internal pressure degree equal to the atmospheric pressure, the first tank having an internal pressure degree lower than the atmospheric pressure.

This allows to take advantage of the degree of vacuum inside the first tank before discharging the cooled material so as to make the process of regulation of the pressure faster and more energy efficient, by means of a true "recycling of the vacuum" in which the first tank aspirates air from the second tank which would otherwise be emptied by a conventional pumping system.

After this, the method comprises collecting from the first tank the mixture of ingredients of the concrete at a first output temperature which is lower than the first initial temperature.

The method can be reiterated several times so as, from time to time, to take advantage of the vacuum created in a tank in order to limit the overall energy consumption and also the times required for cooling the ingredients.

According to a further advantageous aspect of the present invention, said method also comprises loading in the first tank a third quantity of ingredients at a third initial temperature, which ingredients are intended to form said concrete, said ingredients comprising a relevant third predetermined quantity of water.

Subsequently, the pressure inside the second tank is regulated so as to obtain a second transitory degree of vacuum in the second tank.

Also, the pressure inside the condensation chamber is regulated to a further basic degree of vacuum greater than the second transitory degree of vacuum, i.e. such that the pressure in the condensation chamber islower than the pressure in the second tank.

After this, the method comprises operatively connecting the second tank and the condensation chamber so as to substantially equalize the internal pressure in the second tank and in the condensation chamber to a further resulting degree of vacuum so as to cause at least partial evaporation of the water contained in the second tank towards the condensation chamber, so as to lower the temperature of the ingredients in the second tank.

Advantageously, the method comprises condensing in the condensation chamber the water evaporated from the second tank, and, preferably, re admitting it into the second tank as illustrated better hereinafter.

It is then necessary to operatively connect the first tank and the second tank so as to substantially equalize the internal pressure in the first tank and in the second tank to a second further residual degree of vacuum, the first tank having an initial internal pressure degree equal to the atmospheric pressure, the second tank having an initial internal pressure degree lower than the atmospheric pressure.

Finally, the ingredients are collected from the second tank at a second output temperature which is lower than the second initial temperature. According to one aspect, the condensed water is conveyed from the condensation chamber to the first tank and to the second tank so as to keep said respective first and second predetermined quantity of water unvaried.

This makes it possible to not substantially modify the content of water of the various quantities of mixture of concrete ingredients.

Preferably, the first tank and the second tank are operatively connected to a single cyclical vacuum source which is configured to regulate the internal pressure in the first tank and the second tank.

The mixture of ingredients of the concrete can be mixed in the respective tanks so as to form a concrete mix before the ingredients are discharged outside the tank in which they have been cooled.

By this means, the method advantageously makes it possible to then produce concrete which is ready for casting without needing to spend further time mixing the mixture of ingredients of the concrete.

This arrangement makes it possible to facilitate the exchange of heat, and thus the homogenous cooling of all the ingredients in the tank.

In fact, for elementary thermodynamic reasons, stones with a high ratio of volume to surface area are difficult to cool with the evaporation technique, since the layer of water evaporating from the surface of the stone is equivalent in energy terms to a minimal quantity of energy compared with that contained in the stone itself. The mixing of a stone inside a wetted homogenous mixture, on the other hand, ensures that the surface of the stone is always moistened throughout the entire process, thus allowing the stone to release its own heat by making the water on the surface thereof evaporate.

Alternatively, the mixing can be carried out outside the tanks in which the mixture of ingredients of the concrete is cooled, in a dedicated mixing tank.

In some versions, the mixture of ingredients of the concrete is mixed by means of a mechanical mixer.

The value of the basic degree of vacuum and/or the value of the further basic degree of vacuum and/or the value of the transitory degree of vacuum and/or the value of the further transitory degree of vacuum are selected so as, by means of the equalisation of the internal pressure, to obtain a desired value of the intermediate degree of vacuum and/or of the further resulting degree of vacuum.

According to another aspect, a cooling plant for cooling a mixture of ingredients of concrete is provided, comprising a first hermetically sealed tank configured to receive a given quantity of ingredients at a first initial temperature, wherein the ingredients are intended to form the concrete and comprise a predetermined quantity of water, and a condensation system in order to condense the water evaporated from the first tank. The condensation system comprises a condenser and a hermetically sealed condensation chamber configured to receive the evaporated water.

The plant also comprises a recycling pipe which is designed to convey the condensed water from the condensation chamber to the first tank so as to keep said predetermined quantity of water in the ingredients in the first tank substantially unvaried.

Preferably, the water vapor in the condensation chamber precipitates in contact with the condenser at the condensation temperature, and is conveyed once more, advantageously at the condensation temperature, to the first tank. The condenser allows to condense the evaporated water at low temperature, in order not to detract from the efficiency of the vacuum sources.

Advantageously, the plant according to the invention also comprises at least one interconnection valve which is configured to operatively connect the first tank to the condensation chamber.

According to one version, the plant further comprises at least one vacuum source, in order to regulate the internal pressure in the condensation chamber and to regulate the pressure in the first tank. According to a preferred aspect, the vacuum source comprises a first vacuum source known as the "basic vacuum source" and a second vacuum source known as the "cyclical vacuum source", which sources are designed to regulate the pressure respectively in the condensation chamber and in the first tank.

According to some preferred embodiments, the plant for cooling the concrete comprises a plurality of hermetically sealed tanks, each tank of the plurality of hermetically sealed tanks being designed to receive a relevant quantity of ingredients for forming the concrete at a relevant first initial temperature, the ingredients comprising a respective first and second predetermined quantity of water.

Advantageously, connection ducts are provided in order to operatively connect the tanks, so as to equalize the pressures in the tanks which are connected to one another by means of a succession of connections, thus allowing to reduce the energy consumption of the plant.

This allows to always keep the cooling and pumping process in operation, with consequent reduction of the energy consumption and elimination of dead times.

According to a further advantageous aspect, the process uses the vacuum created in one tank in order to partly depressurize a second tank so as to maximize the use of the residual degree of vacuum present inside the hermetically sealed tanks before the tanks are emptied.

Preferably, the plant also comprises a condensation system in order to condense the water evaporated from the tanks of said plurality of tanks, said condensation system comprising a condenser and a hermetically sealed condensation chamber which is configured to collect said evaporated water.

According to a further aspect of the invention, the condensation system comprises a plurality of condensation chambers which are separate from one another, each condensation chamber comprising a relevant condenser in its interior. According to this aspect of the invention, the number of condensation chambers is equal to the number of hermetically sealed tanks which the plant comprises, each condensation chamber being designed to be operatively connected to a relevant hermetically sealed tank.

Preferably, the plant also comprises at least one interconnection valve in order to operatively connect said condensation chamber to the tanks of said plurality of tanks, in order to make the evaporated water flow from the first tank or from the second tank to the condensation chamber.

At least one vacuum source is then provided in order to regulate the internal pressure in the condensation chamber and in the tanks of said plurality of tanks. Preferably, a basic vacuum source is provided in order to regulate the internal pressure in the condensation chamber, and a cyclical vacuum source is provided in order to regulate the internal pressure in each tank of the plurality of hermetically sealed tanks.

Preferably, the plant comprises at least one equalization valve which is configured to operatively connect a first tank and a second tank of said plurality of tanks so as to substantially equalize the internal pressure in said first tank and said second tank. Thus, in the conditions in which there is at least one tank which has a residual degree of vacuum and contains cooled concrete, and at least one other tank which has an internal pressure equal to the atmospheric pressure and contains concrete to be cooled, then the equalization of the internal pressure between the two hermetically sealed tanks is operated. Said equalization results in a partial recycling of the residual degree of vacuum, at the expense of the degree of vacuum in the tank containing concrete which has already been cooled, and to the advantage of the degree of vacuum in the tank containing concrete still to be cooled.

Said equalization is advantageous since it allows to take advantage of the depressurization operated in one tank in order to lower the pressure in another tank. This depressurization would be lost by discharging the cooled ingredients from the tank.

Thus, the partial recycling of a residual degree of vacuum inside the tank containing a mixture of cooled ingredients is advantageous since it reduces the time and the energy required to reach the degree of vacuum required to cool the material inside another tank containing a mixture of ingredients to be cooled.

According to another advantageous aspect, the use of a plurality of interconnected tanks results in an economic advantage, since it allows the cooling unit to operate on one of the tanks for the concrete, whereas the others are engaged in one of the other activities which can take place before or after the cooling activity such as, for example, the stages of loading/unloading the tanks and equalization of the internal pressure. By this means, the cooling unit works continuously, and its use is shared by the tanks for cooling the concrete, which are then connected to a single condensation chamber by means of a network of pipes.

Similarly, the cyclical vacuum source, i.e., the pumping unit, can serve one tank after another sequentially without ever stopping. In fact, each stop would correspond to lack of use of a resource, and therefore to a corresponding cost.

According to a further advantageous aspect, the plant comprises a recycling pipe which can convey the condensed water from the condensation chamber to the relevant tank of said plurality of tanks so as to keep said predetermined quantity of water substantially unvaried.

In addition, each tank of said plurality of hermetically sealed tanks preferably comprises a mixer which is designed to mix the dose of the ingredients of the concrete inside the tank. By this means, the plant makes it possible to supply the cooled concrete already kneaded.

According to one aspect, each tank of said plurality of hermetically sealed tanks and/or the condensation chamber is/are provided with a thermally insulating covering. This arrangement makes it possible to increase the efficiency of the cooling process.

Preferably, the capacity of the first hermetically sealed tank and the capacity of each other tank of the plurality of hermetically sealed tanks is determined in order to optimize the operation of the plant by providing the best compromise between the industrial requirement for cooling a large volume of material and the requirement for reducing the volume of the hermetically sealed tanks so as to accelerate the process of regulation of the internal pressure in said tanks, and so as to restrict the energy consumption for the regulation of the internal pressure.

Advantageously, the values of the capacity of the hermetically sealed tanks are determined so as to satisfy the size requirements of the pumping units of the vacuum source.

Preferably, the capacity of the first tank of said plurality of hermetically sealed tanks is between 0.3 and 0.7 $m^3$, preferably between 0.4 and 0.6 $m^3$, and even more preferably the capacity of the first tank is substantially equal to 0.5 $m^3$.

Preferably, each tank of the plurality of hermetically sealed tanks has substantially the same capacity. By this means, it is possible to standardize the production of the tanks. In addition, this characteristic simplifies the equalization of the internal pressure between one tank and another or between one tank and the condensation chamber.

Advantageously, the method and the plant for cooling according to the invention make it possible to cool a mixture of ingredients of the concrete very quickly, almost instantaneously. Advantageously, the invention makes it possible to cool this mixture directly in situ, i.e., in the location where the concrete is to be cast. According to one aspect, the invention thus eliminates the need to maintain the ingredients of the concrete at low temperatures for prolonged periods of time until the moment when the concrete is kneaded and cast. The invention thus also eliminates the energy costs derived from said need.

Altogether, the method and the plant for cooling according to the invention allow an energy saving of between 30% and 40% compared with the systems of the prior art.

According to a further advantageous aspect, the invention makes it possible to cool the mixture of ingredients of concrete to temperatures of 10° C. or even less. In this respect, the value of the pressure inside the hermetically sealed tanks and inside the condensation chamber is regulated according to the initial temperature of the mixture of ingredients of the concrete before cooling and according to the final temperature of said mixture after cooling.

BRIEF DESCRIPTION OF THE DRAWINGS

The characteristics and advantages of the invention will become more apparent from the detailed description of preferred embodiments, illustrated by way of non-limiting example, with reference to the appended drawings in which.

DETAILED DESCRIPTION OF THE PREFERRED EMBODIMENTS

The appended figures show a cooling plant 100 for cooling a mixture of ingredients of concrete according to the present invention.

The cooling plant according to the invention is suitable for cooling a mixture of ingredients of concrete using the latent heat of evaporation of water.

"Mixture of ingredients of concrete" means a mixture with a desired quantity of construction aggregate materials (such as, for example, sand, gravel, crushed stone), binding agent (for example cement) and water, which are loaded together into a hermetically sealed tank. In particular, the water is present in said mixture of ingredients of the concrete in a predetermined quantity so as to comply with the proportion of water or the ratio of water to cement indicated by a recipe of the concrete.

Figure 1:
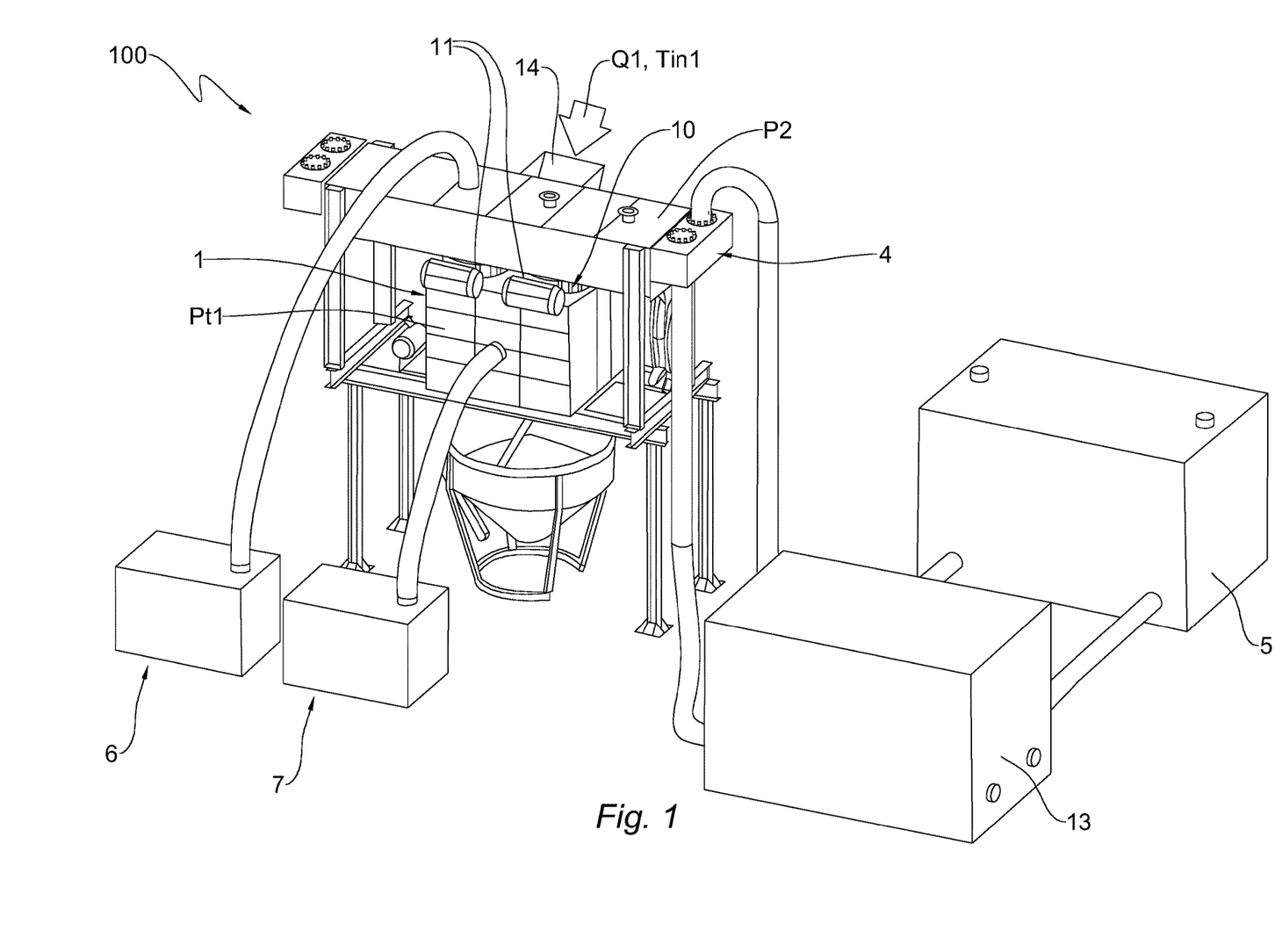
FIGS. 1 and 2 are perspective views of the plant for cooling a mixture of ingredients of concrete according to an embodiment of the present invention.
Figure 2:
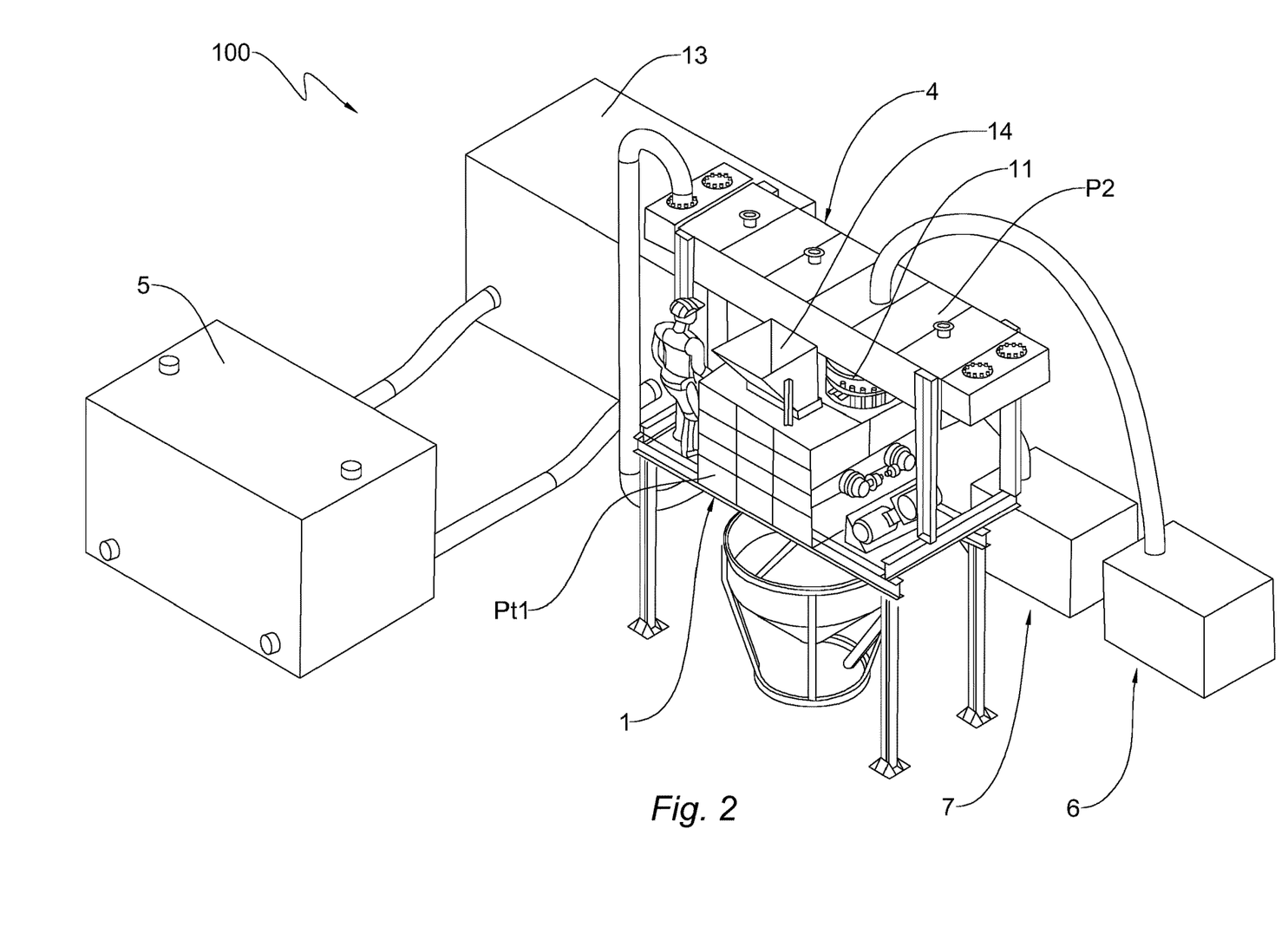
Figure 3:
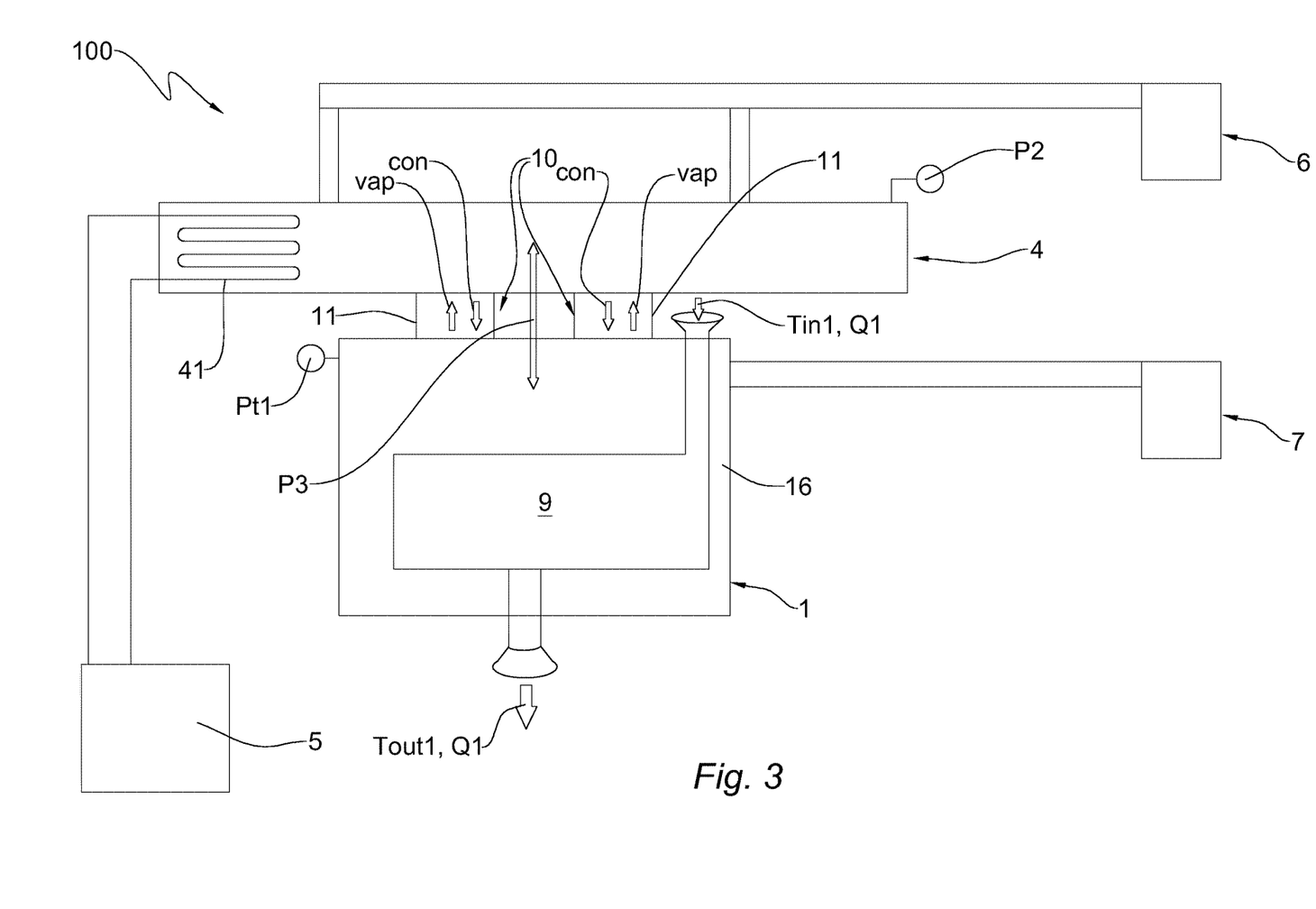
FIG. 3 is a block diagram of the cooling plant in FIG. 1 and 2.

FIGS. 1-3 show a cooling plant 100 according to the invention, comprising a first hermetically sealed tank 1 which is designed to contain a given quantity of mixture of ingredients for forming the concrete.

The plant 100 comprises a first tank 1, a cooler 5, a condensation chamber 4 and a condenser 41 arranged inside the condensation chamber 4 and operatively connected to the cooler 5. In addition, 6 indicates a basic vacuum source, which is operatively connected to the condensation chamber 4, and 7 indicates a cyclical vacuum source, which is operatively connected to the tank 1. The plant 100 also has interconnection valves 11, which are configured to operatively connect the first tank 1 and the condensation chamber 4.

Preferably, the plant 100 is structurally and functionally designed such that the condensation chamber 4 is arranged above the first tank 1. Advantageously, this arrangement allows to take advantage of the force of gravity in order to facilitate the recycling of the condensation water from the condensation chamber 4 to the first tank 1 via a recycling pipe 10, as explained better hereinafter. According to one aspect, the first tank 1 is provided with at least one loading mouth and at least one discharge mouth.

The first tank 1 can have a hopper 14 to facilitate the operation of loading the ingredients of the mixture of ingredients of the concrete into the first tank 1, In a phase of starting the plant 100, the cooler 5 is switched on and time is allowed for the desired cooling temperature to be reached.

In regular operation, a first quantity Q1 of ingredients of the concrete is poured into a first tank 1 at an initial temperature Tin1. Said initial temperature Tin1 is a mean temperature of the ingredients which are poured into the first tank 1 and depends on the temperature of the individual ingredients.

Preferably, loading the first tank 1 requires said tank to have the discharge mouth closed and the loading mouth open.

In operation, the pressure is regulated in said first tank 1 so as to obtain a first transitory degree of vacuum Pt1 in the first tank 1.

In addition, the pressure inside the hermetically sealed condensation chamber 4 is regulated so as to obtain in said condensation chamber 4 a basic degree of vacuum P2 greater than the first transitory degree of vacuum Pt1, i.e., such that the pressure in the condensation chamber 4 is lower than the pressure in the first tank 1.

It is also necessary to operatively connect the first tank 1 and the condensation chamber 4 so as to substantially equalize the internal pressure in the first tank 1 and in the condensation chamber 4 to an intermediate degree of vacuum P3, and to cause at least partial evaporation "vap" of the water from the first tank 1 towards the condensation chamber 4, so as to lower the temperature of said ingredients in the first tank 1. The evaporation of the water comprises the extraction of a quantity of energy corresponding to the latent heat of evaporation of the water, and therefore comprises cooling the ingredients of the concrete which are inside the tank 1.

According to one aspect, the equalization of the pressure between the first tank 1 and the condensation chamber 4 takes place by means of the effect of opening the interconnection valves 11. Preferably, the equalization of the pressure and the evaporation of the water take place via the open interconnection valves 11.

The water vapor obtained from the evaporation of the water in the ingredients in the tank 1 reaches the condensation chamber 4 containing the condenser 41 which is maintained at a condensation temperature by means of the cooler 5. The water vapor in the condensation chamber 4 which is in contact with the condenser 41 at the condensation temperature precipitates as condensed water "con" and would tend to collect in the condensation chamber.

Preferably simultaneously, the condensed water "con" is conveyed from the condensation chamber 4 to the first tank 1 so as to keep the first predetermined quantity of water in the first tank 1 substantially unvaried. Preferably, this recirculation of the condensation water takes place via the recycling pipe 10. According to an advantageous aspect, the recycling pipe 10 makes it possible to collect the condensation water "con" and convey it so as to keep the condenser 41 isolated from the heat from the external environment. According to a further advantageous aspect, the recycling pipe 10 makes it possible to convey the evaporated water "vap" through the interconnection valve 11 from the first tank 1 to the condensation chamber 4, and also makes it possible to collect the condensation water "con" and convey it once more to the first tank 1. According to one aspect, the first tank 1 comprises a valve which is configured to eliminate the residual degree of vacuum inside the first tank 1, once the cooling cycle has ended inside said first tank 1. In practice, said valve equalizes the internal pressure in the first tank 1 and the external atmospheric pressure. Advantageously, the elimination of the residual degree of vacuum permits the opening of the discharge mouth of the first tank 1.

At the end of the cooling process, the ingredients are collected from the first tank 1 at an output temperature Tout1 lower than said first initial temperature Tin1, said first output temperature Tout1 being the mean temperature of the material collected from the first tank 1.

The first output temperature Tout1 can be between 5° C. and 25° C., on the basis of parameters of influence such as the thermal inertia and the quantity of material introduced into the first tank, the initial temperature of said material, and the quantity of water evaporated/condensed during the process.

According to preferred embodiments, the condenser 41 receives cooled water from the cooler 5.

According to one aspect, the plant 100 comprises an accumulation tank 13 which is operatively connected to the cooler 5 and to the condenser 41. The accumulation tank 13 can be configured to receive the water cooled by the cooler 5 and admit it into the condenser 41.

Advantageously, the accumulation tank 13 makes it possible to prevent continuous rapid variations of temperature in the cooled water as a result of the intermittence of the regulation. According to a further advantageous aspect, the accumulation tank 13 makes it possible to limit the number of times a compressor of the cooler 5 is switched on/off per hour to an acceptable value, especially in the conditions in which the cooling process is stopped, deliberately or unintentionally, and it is necessary to ensure that the cooler 5 has a certain stability of operation. This is obtained thanks to a quantity of stored water contained in the accumulation tank 13.

Figure 4:
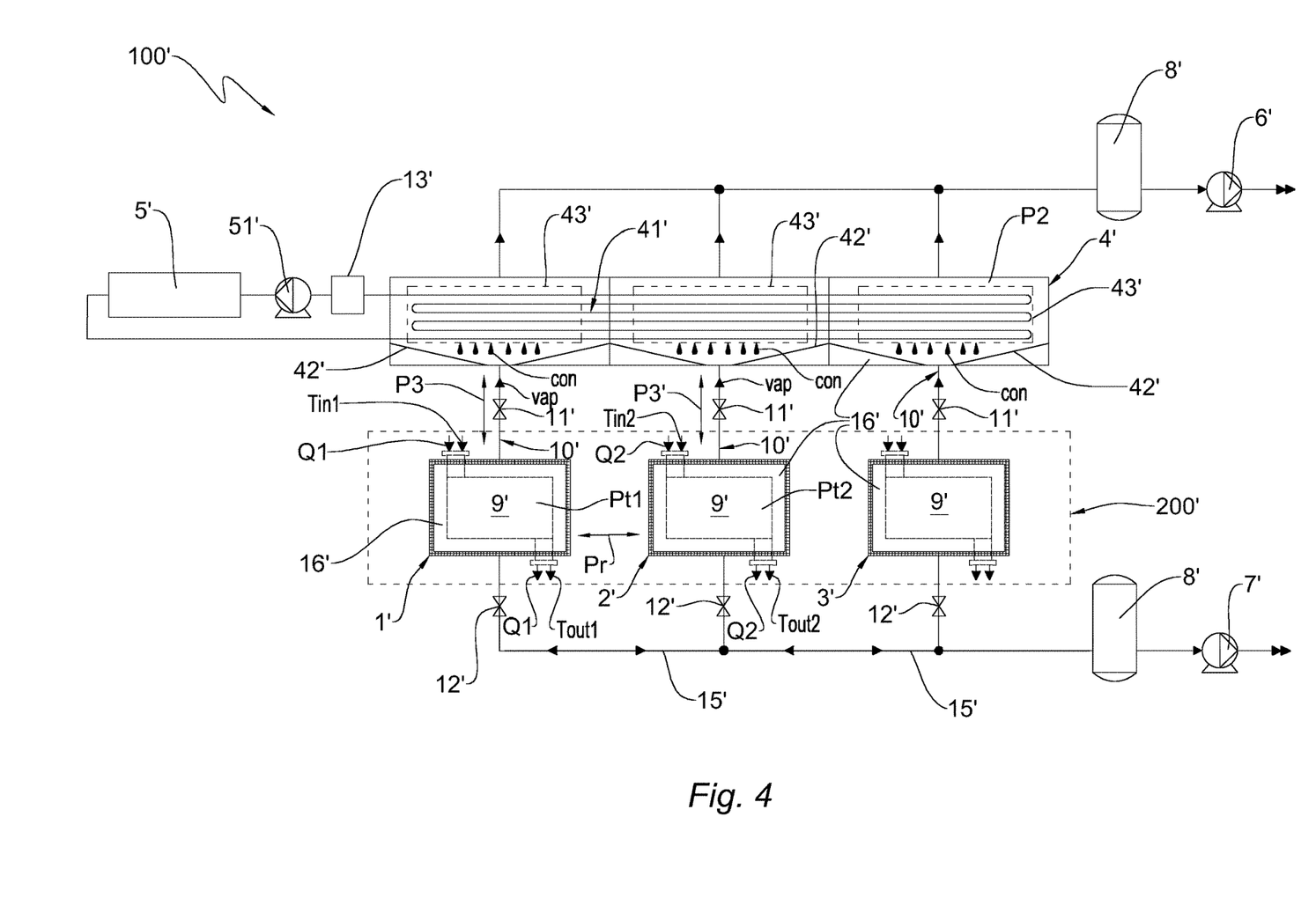
FIG. 4 is a block diagram of the plant for cooling a mixture of ingredients of concrete according to a second embodiment of the present invention.

According to another embodiment shown in FIG. 4, the accumulation tank 13' is configured to receive the water from the condenser 41' and to admit the water into the cooler 5' so as to guarantee that the cooler 5' continuously has a head of water.

According to one aspect, the ingredients of the mixture of ingredients of the concrete are mixed, i.e., kneaded so as to amalgamate them and form a concrete mix. According to one aspect, the plant 100 comprises a mixer 9 which can produce said concrete mix from the mixture of ingredients of the concrete. Preferably, as shown in FIG. 3, the mixer 9 is placed inside the first tank 1 so as to mix or knead said mixture during the cooling process. This solution makes it possible to reduce the times required for the production of the concrete mix ready for casting. Advantageously, the plant 100 permits cooling of the construction aggregates or of the concrete already produced, or of the roller-compacted concrete (RCC).

FIG. 4 shows an alternative embodiment of a cooling plant 100' according to the invention, in which parts corresponding to those previously described will be indicated with the same reference numerals provided with an apostrophe and will not be described in detail.

In the embodiment in FIG. 4, the plant 100' comprises a plurality of tanks 200', each tank of the plurality of tanks 200' being designed to receive the ingredients of the mixture of concrete to be cooled.

The plurality of tanks 200' comprises at least one first tank 1' and one second tank 2' and one third tank 3'. According to other versions not shown, a different number of tanks can be provided which is more than or equal to two.

The tanks are interconnected to one another by means of equalization valves 12' so as to permit recycling of the residual vacuum from one tank to another. Preferably, each hermetically sealed tank of the plurality of tanks 200' is provided with an equalization valve 12', which is dedicated to operatively connecting the tank to one or more of the other hermetically sealed tanks.

In addition, the plant 100' comprises the condensation chamber 4' and an interconnection valve 11' interposed between the condensation chamber 4' and each tank 1'-3' of the plurality of tanks 200'.

According to one aspect, inside the condensation chamber 4' a single condenser 41' is provided which can condense the evaporated water "vap" from each tank 1'-3' of the plurality of hermetically sealed tanks 200', instead of a separate condenser for each tank. This arrangement makes it possible to reduce the plant costs, since it comprises adopting a single condenser 41', a single water pump 51' for the cooling circuit of said condenser 41', and a single basic vacuum source 6' in order to depressurize the condensation chamber 4'. According to one version, the basic vacuum source 6' can comprise a plurality of vacuum pumps, such as, for example, three vacuum pumps, so as to permit the use of a larger-sized condenser 41'. According to a further advantageous aspect, the use of a single larger-size condenser 41' makes it possible to increase the energy efficiency, thanks to the reduction of the losses of load, such as, for example, the losses of load through a tube bundle of the condenser, and it also makes it possible to reduce the energy consumption thanks to the larger extent of the surface area for heat exchange, such as, for example, the heat exchange surface area of said tube bundle for the same quantity of cooled water passing through the condenser itself.

Advantageously, each tank 1'-3' is provided with a mouth for loading ingredients of the concrete to be cooled, and with a mouth for discharging the cooled concrete, neither of the two being shown in the figures.

The method for cooling the concrete implemented on the plant 100' provided with the plurality of tanks 200' comprises operating the following cycle.

In a starting phase, the cooler 5' is switched on, and time is allowed for the cooler to reach the desired temperature, and in the meantime the pressure is regulated inside the plurality of hermetically sealed tanks 200' and inside the condensation chamber 4' so as to obtain an initial degree of vacuum.

Preferably, the tanks of the plurality of hermetically sealed tanks 200' and the condensation chamber 4', which is also hermetically sealed, are operatively connected to one another so as to obtain a single environment with a substantially homogenous internal pressure. In practice, the interconnection valves 11' and the equalization valves 12' are opened in order to operatively connect the tanks 1'-3' of the plurality of hermetically sealed tanks 200' and the condensation chamber 4' to one another.

In addition, the tanks 1'-3' are advantageously closed in a sealed manner in order to isolate them from the external environment, and the pressure is regulated inside the tanks 1'-3' of the plurality of hermetically sealed tanks 200' and inside the condensation chamber 4' so as to obtain a homogenous initial degree of vacuum inside said environment of the tanks The homogenous initial degree of vacuum is obtained by means of the basic vacuum source 6' or the cyclical vacuum source 7' and can correspond to a pressure value which for example is equal to 10 millibar.

The closure of the interconnection valves 11' and of the equalization valves 12' concludes the starting phase.

A first quantity Q1 of ingredients at a first initial temperature Tin1 is then loaded into the first tank 1', said ingredients being intended to form said concrete, said ingredients comprising a first predetermined quantity of water.

The first initial temperature Tin1 represents a mean temperature which depends on the temperature of the individual ingredients of the concrete. At this point, the first tank 1' and the second tank 2' are operatively connected so as to substantially equalize the internal pressure in the first tank 1' and in the second tank 2' to a residual degree of vacuum Pr, the first tank 1' having an initial internal pressure degree equal to the atmospheric pressure Patm, the second tank 2' having an initial internal pressure degree lower than the atmospheric pressure Patm.

A second quantity Q2 of ingredients at a second initial temperature Tin2 is then loaded into the second tank 2', said ingredients being intended to form said concrete, said ingredients comprising a second predetermined quantity of water.

Like the first initial temperature Tin1, the second initial temperature Tin2 also represents a mean temperature which depends on the temperature of the individual ingredients of the concrete.

Preferably, the second quantity Q2 and the second initial temperature Tin2 are substantially equal to the first quantity Q1 and to the first initial temperature Tin1, respectively.

The pressure inside the first tank 1' must also be regulated so as to obtain a first transitory degree of vacuum Pt1 in the first tank 1'.

The pressure is also regulated inside the hermetically sealed condensation chamber 4' so as to obtain therein a basic degree of vacuum P2 greater than the first transitory degree of vacuum Pt1, i.e. such that the pressure in the condensation chamber 4' is lower than the pressure in the first tank 1'.

After this, the first tank 1' and the condensation chamber 4' are operatively connected so as to substantially equalize the internal pressure in the first tank 1' and in the condensation chamber 4' to a resulting degree of vacuum P3 so as to cause at least partial evaporation "vap" of the water contained in the first tank 1' towards the condensation chamber 4', so as to lower the temperature of said ingredients in the first tank 1'.

The water evaporated from the first tank 1' is then condensed in the condensation chamber 4'.

Subsequently, the first tank 1' and the second tank 2' are operatively connected so as to substantially equalize the internal pressure in the first tank 1 and in the second tank 2' to a further residual degree of vacuum Pr', the second tank 2' having an initial internal pressure degree equal to the atmospheric pressure Patm, the first tank 1' having an initial internal pressure degree lower than the atmospheric pressure Patm.

According to one aspect, the equalization of the pressure between the first tank 1' and the second tank 2' takes place as a result of the effect of opening one or more equalization valves 12'. According to one aspect, the plant 100' comprises connection ducts 15' which can operatively connect each tank of the plurality of tanks 200' so as to equalize the internal pressure inside the tanks.

At this point, it is possible to collect said ingredients from the first tank 1' at a first output temperature Toutl lower than said first initial temperature Tin1.

According to one aspect, the condensation water is conveyed once more from the condensation chamber 4' to the first tank 1' so as to keep the quantity of water present inside the first tank substantially unvaried compared with the initial quantity. This is in order to comply with the relative proportion of water indicated by the concrete recipe and the ratio of water to cement indicated according to said recipe. Advantageously, the water evaporated from the first tank 1' is restored to the mix in the form of cold water. Preferably, the condensation chamber 4' and the first tank 1' are operatively connected by means of a recycling pipe 10' which can convey the condensate once more into the first tank 1' containing the mixture of ingredients of the concrete.

According to a further advantageous aspect, the recycling pipe 10' of any tank 1'-3' of the plurality of tanks 200' comprises an upper opening 42' which is located below a heat exchange portion 43' inside the condensation chamber 4'. Advantageously, the recycling pipe 10' can convey the evaporated water "vap" through the interconnection valve 11' from the tank towards the heat exchange portion 43' of the condenser 41'. In turn, as a result of its position above the upper opening 42', the heat exchange portion 43' can exclusively condense the evaporated water "vap" from said tank and conveyed by said recycling pipe 10'.

In addition, the upper opening 42' is configured to receive the condensed water "con" exclusively from the heat exchange portion 43' so as to convey the water to the tank once more. This arrangement makes it possible to keep the quantity of evaporated water "vap" at the output from the tank and the quantity of condensed water "con" which is conveyed once more to said tank substantially equivalent.

According to one aspect, the heat exchange portion 43' can be a tube bundle of the condenser 41', said tube bundle having an exchange surface with dimensions such as to condense the quantity of evaporated water "vap" from a tank of the plurality of hermetically sealed tanks 200'. According to one aspect, the process according to the invention proceeds by loading into the first tank 1' a third quantity Q3 of ingredients intended to form said concrete, said ingredients comprising a relevant third predetermined quantity of water at a third initial temperature Tin3.

It is then necessary to regulate the pressure inside the second tank 2' so as to obtain a second transitory degree of vacuum Pt2 in the second tank 2'.

In addition, in analogy with the phases undergone by the first tank 1', the pressure inside the condensation chamber 4' is regulated to a further basic degree of vacuum P2' greater than the second transitory degree of vacuum Pt2, i.e. such that the pressure in the condensation chamber 4' is lowerthan the pressure in the second tank 2'.

After this, it is necessary to operatively connect the second tank 2' and the condensation chamber 4' so as to substantially equalize the internal pressure in the second tank 2' and in the condensation chamber 4' to a further resulting degree of vacuum P3' so as to cause at least partial evaporation "vap" of the water contained in the second tank 2' towards the condensation chamber 4', so as to lower the temperature of said ingredients in the second tank 2'.

The water evaporated by the second tank 2' is then condensed in the condensation chamber 4'.

Subsequently, the first tank 1' and the second tank 2' are operatively connected so as to substantially equalize the internal pressure in the first tank 1' and in the second tank 2' to a second further residual degree of vacuum Pr", the first tank 1' having an initial internal pressure degree equal to the atmospheric pressure Patm, the second tank 2' having an initial internal pressure degree lower than the atmospheric pressure Patm.

Finally, said ingredients can be collected from the second tank 2' at a second output temperature Tout2 lower than said second initial temperature Tin2, said second output temperature Tout2 being the mean temperature of the material collected from the tank 2'.

According to one aspect, the cyclical vacuum source 7' comprises a vacuum tank 8' which is operatively connected to each tank of the plurality of hermetically sealed tanks 200' so as to accelerate the regulation of the internal pressure in each tank of the plurality of hermetically sealed tanks 200'.

According to one aspect, the plant 100' and the method for cooling according to the present invention can be used to cool a mixture of water and sand in the absence of stones and in the absence of binding agents, such as, for example, cement.

According to a further advantageous aspect, the basic vacuum source 6' comprises a vacuum tank 8' which is operatively connected to the condensation chamber 4' so as to accelerate the times required to regulate the basic degree of vacuum inside the condensation chamber 4'. According to preferred embodiments, each tank 1'-3' of said plurality of hermetically sealed tanks 200' comprises a mixer 9' which is designed to mix the ingredients of the concrete inside the tank itself.

According to a further advantageous aspect, thermal insulation is provided for the condensation chamber 4 and/or for one or more of the tanks 1'-3' for cooling the concrete so as to reduce the absorption of heat from the outside, and thus reduce the energy consumption and the times required for the cooling process.

Preferably, at least one gap 16' is provided, which can be interposed between an outer wall of a tank 1'-3' of the plurality of tanks 200' and a mixer 9' placed inside said tank, or interposed between the condenser 41' and an outer wall of the condensation chamber 4', said gap 16' being able to be depressurized so as to thermally insulate said mixer 9' or said condenser 41'.

Advantageously, the gap 16' surrounds and encloses the condensation chamber 4' or the cooling tanks so as to reduce the absorption of heat from the outside.

The invention thus solves the problem posed, and achieves numerous advantages, including:
- the possibility of cooling a mixture of ingredients of concrete (both conventional concrete and RCC) to temperatures of 10° C. or less; recycling of the condensation water so as to substantially not alter the quantity of water provided in the mixture of concrete ingredients according to a predetermined recipe of the concrete;
- use of a plurality of compact tanks for the concrete which comprise a smaller volume to be emptied, and thus a reduction of the plant costs;
- interconnection logic between tanks designed to contain the mixture of concrete ingredients which makes it possible to always keep the cooling and pumping process in operation, with consequent elimination of dead times;
- a cooling process which comprises an energy saving of more than 30% compared with the cited prior art;
- the possibility of using a single condenser to condense the water evaporated from a plurality of tanks for the concrete;
- use of the residual degree of vacuum inside the concrete ingredient tanks before discharging the cooled material;
- a cooling process which is ready for production in a few minutes and allows the concrete to be cooled in less than an hour;
- a cooling process which allows to cool the concrete in real time without being affected by the state of the plants upstream or downstream, and without requiring energy for the pre-cooling of the construction aggregates or for maintenance of the temperature.

The invention claimed is:

1. Method for cooling a mixture of ingredients of concrete, comprising:
loading in a first hermetically sealed tank a first given quantity of ingredients at a first initial temperature, said ingredients being intended to form said concrete and comprising a first quantity of water and cement in a predetermined ratio;
regulating a pressure in said first tank so as to obtain a first transitory degree of vacuum in said first tank;
regulating a pressure inside a hermetically sealed condensation chamber so as to obtain a basic degree of vacuum in said condensation chamber that is greater than the first transitory degree of vacuum, such that the pressure in the condensation chamber is lower than the pressure in the first tank;
operatively connecting the first tank and the condensation chamber so as to substantially equalize the pressure in the first tank and in the condensation chamber to a resulting degree of vacuum and to cause at least partial evaporation of the water from the first tank towards the condensation chamber so as to lower the temperature of said ingredients in the first tank;
condensing in the condensation chamber the water evaporated from the first tank;
conveying the condensed water from the condensation chamber to the first tank so as to keep said predetermined ratio of water to cement in the first tank substantially unvaried; and
collecting said ingredients from the first tank at a first output temperature lower than said first initial temperature.

2. The method according to claim 1, wherein the method further comprises mixing the ingredients of the concrete in the first tank.

3. Method for cooling a mixture of ingredients of concrete, comprising:
loading in a first tank of a plurality of hermetically sealed tanks a first quantity of ingredients at a first initial temperature, said ingredients being intended to form said concrete, said ingredients comprising a first quantity of water and cement in a predetermined ratio;
operatively connecting the first tank and a second tank of said plurality of hermetically sealed tanks so as to substantially equalize the internal pressure in the first tank and in the second tank to a residual degree of vacuum, the first tank having an initial internal pressure degree equal to atmospheric pressure, the second tank having an initial internal pressure degree lower than atmospheric pressure;
loading in the second tank a second quantity of ingredients at a second initial temperature, said ingredients being intended to form said concrete, said ingredients comprising a second predetermined quantity of water and cement in a predetermined ration;

regulating the pressure inside the first tank so as to obtain a first transitory degree of vacuum in the first tank;

regulating a pressure inside a hermetically sealed condensation chamber so as to obtain a basic degree of vacuum in said condensation chamber that is greater than the first transitory degree of vacuum, such that the pressure in the condensation chamber is lower than the pressure in the first tank;

operatively connecting the first tank and the condensation chamber so as to substantially equalize the internal pressure in the first tank and in the condensation chamber to a resulting degree of vacuum so as to cause at least partial evaporation of the water contained in the first tank towards the condensation chamber so as to lower the temperature of said ingredients in the first tank;

condensing in the condensation chamber the water evaporated from the first tank;

conveying the condensed water from the condensation chamber to the first tank and to the second tank so as to keep the ratio of water to cement in the first tank and the second tank substantially unvaried;

operatively connecting the first tank and the second tank so as to substantially equalize the internal pressure in the first tank and in the second tank to a further residual degree of vacuum, the second tank having an initial internal pressure degree equal to the atmospheric pressure, the first tank having an initial internal pressure degree lower than the atmospheric pressure;

collecting said ingredients from the first tank at a first output temperature lower than said first initial temperature.

4. The method according to claim 3, further comprising a starting phase which comprises:

operatively connecting each tank of said plurality of hermetically sealed tanks and said hermetically sealed condensation chamber;

regulating the pressure inside the hermetically sealed tanks and inside the condensation chamber so as to obtain an initial homogenous degree of vacuum.

5. The method according to claim 3, wherein the method further comprises operatively connecting the first tank and the second tank to a single cyclical vacuum source configured to regulate the internal pressure in the first tank and in the second tank.

6. The method according to claim 3, further comprising mixing the ingredients of the concrete in at least one of the first tank or the second tank.

7. Plant for cooling a mixture of ingredients of concrete, comprising:

a first hermetically sealed tank configured to receive a given quantity of ingredients at a first initial temperature, said ingredients being intended to form said concrete, said ingredients comprising a quantity of water and cement in a predetermined ratio:

a condensation system in order to condense the water evaporated from the first tank, said condensation system comprising a condenser and a hermetically sealed condensation chamber configured to collect said evaporated water;

at least one interconnection valve configured to operatively connect said first tank to said condensation chamber;

at least one vacuum source in order to regulate the internal pressure in the condensation chamber and in the first tank;

a recycling pipe configured and intended for conveying the condensed water from the condensation chamber to the first tank so as to keep said predetermined ratio of water to cement in the first tank substantially unvaried.

8. The plant according to claim 7, wherein said at least one vacuum source comprises a basic vacuum source and a cyclical vacuum source which are designed to regulate pressure in the condensation chamber and in the first tank, respectively.

9. The plant according to claim 7, wherein said first tank or said second tank of said plurality of hermetically sealed tanks comprises a mixer designed to mix the ingredients of the concrete inside the relevant tank.

10. The plant according to claim 7, further comprising at least one gap positioned so as to be interposed between an outer wall of a tank and a mixer placed inside said tank, or interposed between said condenser and an outer wall of said condensation chamber, said gap being able to be depressurized so as to thermally insulate said mixer or said condenser.

11. The plant according to claim 7, wherein the capacity of said first tank is between 0.3 and 0.7 $m^3$.

12. Plant for cooling a mixture of ingredients of concrete, comprising:

a plurality of hermetically sealed tanks, each tank of said plurality of hermetically sealed tanks being designed to receive a respective quantity of ingredients for forming said concrete at a relevant first initial temperature, said ingredients comprising a respective first and second quantity of water and cement in a predetermined ratio;

a condensation system in order to condense the water evaporated from the tanks of said plurality of hermetically sealed tanks, said condensation system comprising a condenser and a hermetically sealed condensation chamber configured to collect said evaporated water;

a recycling pipe for each tank of said plurality of tanks, said pipe conveying the condensed water from the condensation chamber to a relevant tank of said plurality of tanks so as to keep said predetermined ratio of water to cement in the relevant tank substantially unvaried;

at least one interconnection valve in order to operatively connect said condensation chamber to each of the tanks of said plurality of tanks, in order to make the evaporated water flow from the first tank or from the second tank to the condensation chamber;

at least one vacuum source in order to regulate the internal pressure in the condensation chamber and in the tanks of said plurality of tanks;

at least one equalization valve configured and intended for operatively connecting a first tank and a second tank of said plurality of tanks so as to substantially equalize the internal pressure in said first tank and said second tank.

13. The plant according to claim 12, wherein the recycling pipe of a tank of said plurality of tanks comprises an upper opening positioned below a heat exchange portion inside said condensation chamber, said recycling pipe being able to convey the evaporated water through said interconnection valve from said tank towards said heat exchange portion of said condenser, said heat exchange portion being dedicated to exclusively condensing the evaporated water from said tank and conveyed by said recycling pipe, said upper opening being able to receive the condensed water exclusively from said heat exchange portion so as to convey it once more to said tank.

14. The plant according to claim 12, wherein each tank of said plurality of hermetically sealed tanks has substantially the same capacity.

\* \* \* \* \*